Figure 1:
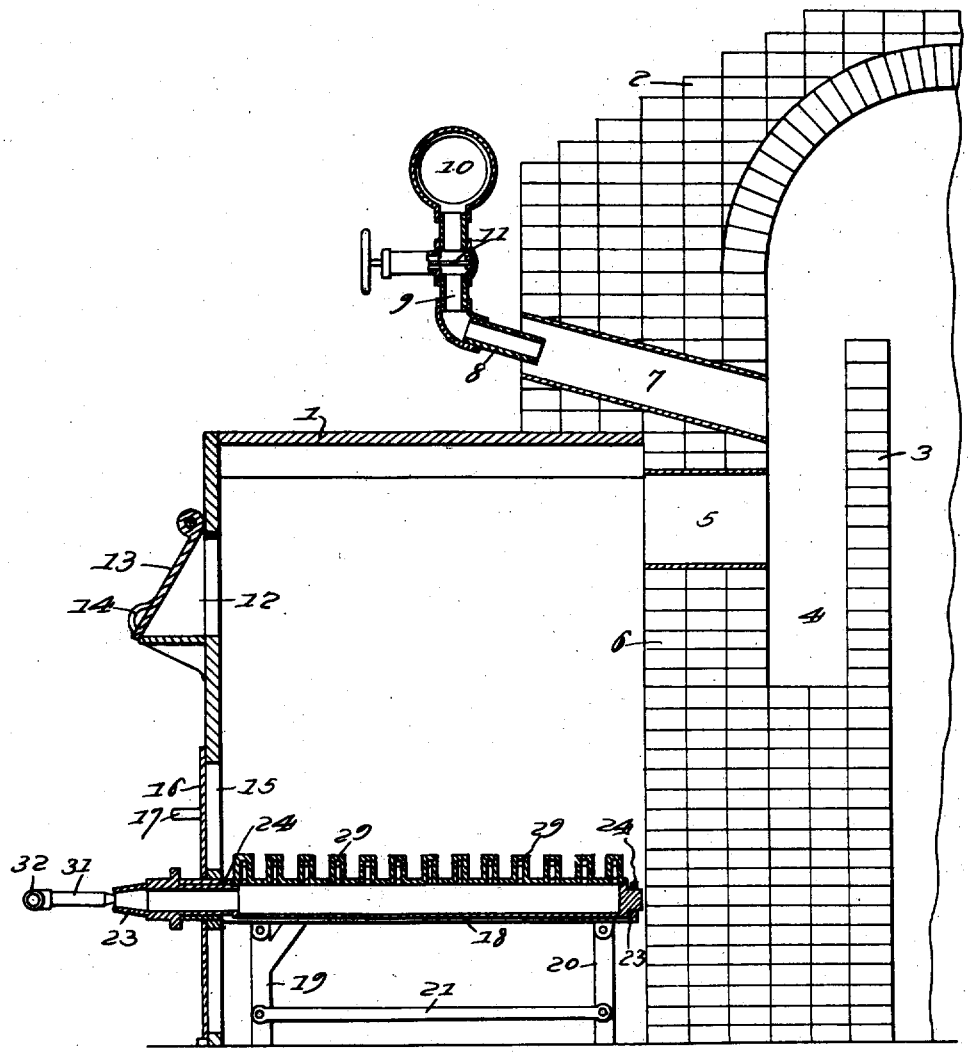

L. M. UNDERWOOD.

KILN AND THE METHOD OF OPERATING THE SAME.

APPLICATION FILED MAR. 10, 1921.

Reissued Aug. 30, 1921. 15,186.

2 SHEETS—SHEET 1.

Inventor

Lois M. Underwood,

By J. B. Kenton

Attorney

L. M. UNDERWOOD.

KILN AND THE METHOD OF OPERATING THE SAME.

APPLICATION FILED MAR. 10, 1921.

Reissued Aug. 30, 1921. 15,186.

2 SHEETS—SHEET 2.

Inventor

Lois M. Underwood,

By J. D. Newton

Attorney

UNITED STATES PATENT OFFICE.

LOIS M. UNDERWOOD, OF DAYTON, OHIO.

KILN AND THE METHOD OF OPERATING THE SAME.

15,186. Specification of Reissued Letters Patent. Reissued Aug. 30, 1921.

Original No. 1,337,298, dated April 20, 1920, Serial No. 281,613, filed March 10, 1919. Application for reissue filed March 10, 1921. Serial No. 451,287.

*To all whom it may concern:*

Be it known that I, LOIS M. UNDERWOOD, a citizen of the United States, residing at Dayton, in the county of Montgomery and State of Ohio, have invented a new and useful Improvement in Kilns and the Method of Operating the Same, of which the following is a specification.

My invention relates to new and useful improvements in kilns and the method of operating the same and more especially to a kiln provided with an individual gas producer chamber or compartment which may be a unitary part of the kiln structure, and to a removable twyer which may be placed in said compartment to produce the gas and may be thereafter removed from said compartment and placed in that of another kiln to perform the same function until all of the kilns are supplied with the necessary gas for the operation and to the method of operating kilns having these features.

The invention is applicable to a single kiln or any number of kilns arranged *en bloc*, where each individual kiln is provided with this gas producer chamber or compartment.

The object of the invention is to provide a kiln or each individual kiln, where there are a number arranged *en bloc*, with its own individual gas producer chamber, and a twyer which is adapted to be used in the gas producer compartment of each kiln and removed to another after each kiln is supplied with producer gas sufficient for burning the ware therein.

A further object of the invention is to provide means in each kiln for supplying the gas produced with a suitable amount of additional air, as the said gas passes from the producer chamber or compartment into the combustion chamber of the kiln.

By the employment of the means to be described hereinafter, the gas produced in a producer chamber or compartment of each kiln passes directly into the kiln behind the bag wall, where it may be further mixed with additional air and burned. The gas passing out of the producer chamber is thus mixed with a regulated supply of air under pressure, and the products of combustion pass directly into the body of the kiln from which the exhaust gas passes out through a stack in the usual manner, after the ware has been burned.

The difficulty of burning producer gas in a cold furnace is well known, but such difficulty is removed by means of the individual gas unit producer, which at the beginning of the operation can be employed as a furnace until the kiln is brought to a sufficient temperature to burn the gas, and when this is done, the furnace is converted into a gas producer chamber or compartment, by closing the front portion and using sufficient air through the twyers to cause sufficient combustion to distil the gas out of the coal, and by employing the secondary air passage to supply air to the point where the combustion is desired in the kiln.

The preferred form of embodiment of my invention is illustrated in the accompanying drawings of which;

Figure 1 is a side elevation in section, showing a portion of a kiln, and furnace or gas producer structure combined therewith.

Figure 2:
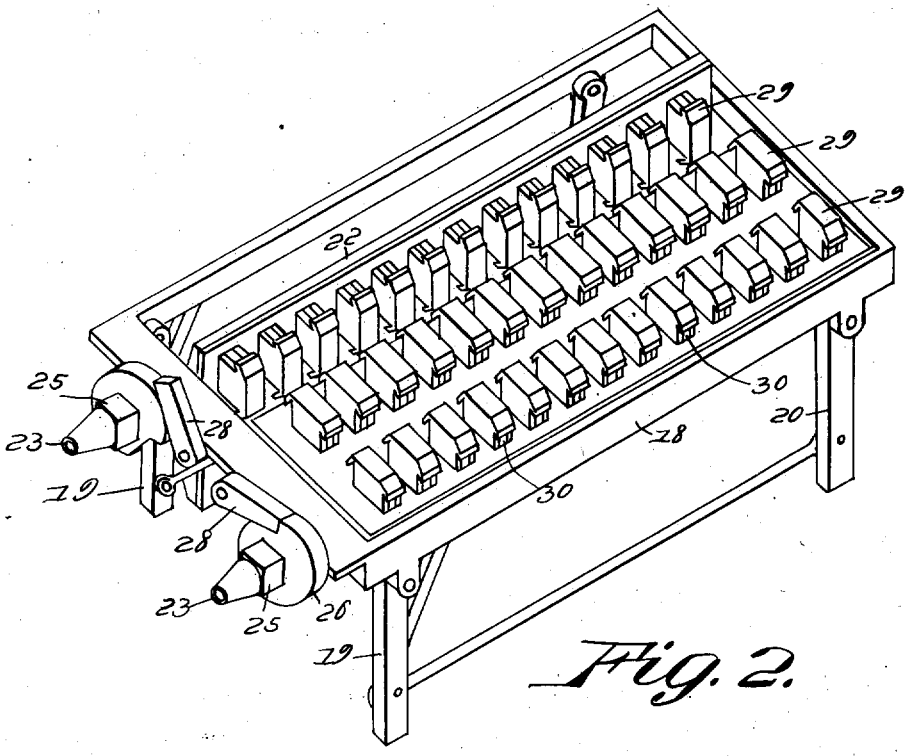
Figure 3:
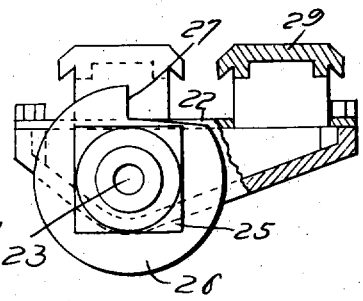

Fig. 2 is a perspective view of the portable twyer and supporting table. In this view one of the twyer supporting plates or bars is shown in a dumping position. And, Fig. 3 is an end view, partly in section of one of the tilting twyer supporting plates or bars.

Throughout the specification and drawings similar reference characters indicate corresponding parts.

Referring to the accompanying drawings in more particular terms, the numeral 1 designates the inclosing wall of a combined furnace and gas producer chamber or compartment which is combined with the front portion of the kiln structure 2. The said chamber is a part of the kiln structure by being built in the wall thereof and is provided with a suitable communication between the said chamber and the interior of the kiln. Formed in the kiln by the bag wall 3 is a combustion or mixing chamber 4 that connects with the furnace and gas producer chamber through an opening or conduit 5, provided in the upper portion of the wall 6 of the kiln. This conduit 5 forms the connection between the furnace and the gas producer chamber, and the combustion or mixing chamber 4 of the kiln. When the furnace or gas producer chamber is used as a gas producer, the conduit 5 directs the gas to a point in the combustion or mixing chamber 4 where combustion is effected by a forced draft of additional air, that is conducted to the latter through a supplemental air supply tube 7.

Projecting into the outer open end of the tube 7, is a nozzle 8 connected to a vertical tube 9 that communicates with a main air line 10, from which air under pressure is received to effect combustion of the producer gas in the chamber 4.

By means of a valve 11 provided in the vertical tube 9, the supply of air under pressure for the combustion chamber 4 can be regulated. Accordingly, to effect a greater or a less combustion of the producer gas in the chamber 4, air can be admitted to the latter under a greater or a less pressure by operating the control valve 11. (See Fig. 1).

Coming now to a detailed description of the furnace and gas producer chamber 1, there is provided in the upper front portion thereof an opening 12 that is closed by a hinged door 13 provided with a handle 14. In the lower portion of the furnace and gas producer chamber 1 is an opening 15 that is closed by a residue door 16 provided with a handle 17.

Through the opening 15 in the lower portion of the furnace, a twyer supporting-table is adapted to be inserted and removed. By providing this table with two hinged front legs 19 and two rear hinged legs 20 connected by hinged bracing members 21, it is collapsible for the purpose of being easily transported from the furnace and gas producer chamber of one kiln to that of another. (See Figs. 1 and 2). Accordingly, one of my twyer-supporting-tables by being portable, may be made to serve several kilns. The twyer-supporting table may be readily withdrawn through the opening 15, and easily inserted through said opening in another furnace or furnaces to serve them when desired.

The table 18 preferably contains two twyer supporting-plates 22 disposed side by side in the direction of its length in the upper portion of said table. While I have shown two of these plates, any greater or less number may be provided without departing from the spirit of my invention.

Each table plate 22 at its front and its rear end, and at one side of its longitudinal axis, has a trunnion 23 turning in a bearing 24 provided in the table frame. Each front trunnion 23 terminates in a nipple and has a squared portion 25 that terminates at its rear end in a ratchet disk 26. The latter has provided in its periphery a notch 27 in which the nose of a pawl 28 pivoted to the table 18, is adapted to fall by gravity to hold its respective plate 22 in a horizontal position. By means of a wrench applied to the squared portion 25 of the front trunnion 23, the latter may be turned a sufficient distance to release its respective pawl 28, which will permit its respective plate 22 to tilt as shown in Fig. 2 to dump the ashes as will be hereinafter described.

Preferably mounted in two parallel rows upon each plate or tiltable member 22, are twyers 29 whose tops at each end project outwardly and downwardly a short distance to protect the air openings 30 below, against being clogged by clinkers or other particles. These twyers 29 are in communication with their tiltable supporting members 22, which are hollow, as well as the foot trunnions 23 which terminate in nozzles and with which they communicate. Projecting into the nozzle of each front trunnion 23 in a manner to leave an air opening around it, is a steam injecting nozzle 31 provided with a valve 32 to control the pressure of steam issuing through it. As steam passes into and through the trunnion 23, it creates a sufficient vacuum therein to cause air from the outside to rush into the hollow members 22 through the trunnion 23, and thence through the twyers 29 and the firebed which said members 22 support, to force combustion in the furnace when the device is being used as a furnace. It is apparent from the drawing that the twyer openings are much smaller than the air space in the trunnion, thus insuring a practically uniform pressure of air in all the twyers and since the air openings are protected from clogging by the projections on the twyers, a uniform supply of air throughout the fuel bed is maintained when air and steam is forced into the trunnion. By turning the nozzle valve 32, the pressure of the air entering the furnace through the twyers can be increased or diminished. When increased a great blast is created, resulting in a more intense fire and requiring a faster application of fuel.

By tilting the members 22 as hereinbefore described, the ashes may be readily dumped from them.

When the furnace is used as a gas-producer for a kiln of which it is a part, my method contemplates the operation of it as a furnace and gas producer chamber for a short time as above described, to bring the kiln to a sufficient temperature to heat the gas. When this is done, the furnace is converted into a producer by closing its front portion and turning the valve 32 to permit only enough air to issue through the twyers to cause sufficient combustion to distil the gas out of the coal. The gas produced will then pass through the conduit 5 into the combustion chamber 4 of the kiln, where it is mixed with a regulated supply of air under pressure that issues from the tube 7. By turning the valve 11, the pressure of this secondary air supply can be regulated to produce the character of combustion desired for the kiln. It is thus seen that this secondary air supply device carries air to the point where combustion is desired in the kiln, the gas being produced in the kiln's own furnace, with all the advantages hereinbefore set forth.

Among the advantages of my improved individual gas producer features in kilns, may be mentioned the following:

(1) After the twyer as a whole is removed from one furnace and gas producer chamber to another, the said chamber, after the ware has been burning in the kiln, supplies sufficient air to the kiln for cooling the burned ware.

(2) The means are simple and kilns already in use may be provided therewith at comparatively small cost. (3) The loss or dissipation of effective heat through radiation where the heat is controlled through tunnels which connect the kilns with large gas producer units is avoided. (4) As compared to other gas burning systems with which I am familiar, a substantial portion of the cost of installation is eliminated. (5) The danger due to gas explosions is very materially avoided, since there is no chance for the accumulation of gas in quantities, the gas being burned as soon as it enters the kiln from the producer chamber; and other advantages might be enumerated.

Having described my invention, I claim:

1. In a kiln provided with a stationary furnace and gas producer chamber, and a conduit forming a passageway from said chamber to the combustion chamber of the kiln, and an auxiliary air conduit through which additional air is supplied to the combustion chamber, a portable grate including a series of hollow tilting bars with nozzles through which steam and air are injected into said bars, a series of twyers mounted on each bar and having air passages communicating with the interior of said bars, and an individual steam injecting nozzle extended into the nozzle of each of said bars, substantially as described.

2. A series of kilns provided each with a stationary furnace and gas producer chamber, a conduit forming a communication between said chamber and the combustion chamber of the kiln, and a supplementary air conduit to supply air to said combustion chamber, a portable grate adapted to be removed from the furnace and gas producer chamber of one kiln to that of another in the successive generation of gas, said grate comprising a series of hollow bars the front ends of which terminate in nozzles adapted to receive steam and air, and a series of twyers supported on each of said bars, substantially as specified.

3. A kiln having a bag-wall and a combustion chamber behind said bag wall, and a combined individual furnace and gas producer chamber forming a unitary part of the kiln structure, the upper part of said furnace and gas producer chamber communicating with said combustion chamber, and a portable gas producer element comprising a series of twyers supported on parallel hollow bars and adapted to be successively placed in the furnace and gas producer chambers of a series of kilns of like structure, substantially as described.

4. The combination with a kiln for burning ware, of a combined furnace and gas producer built against the exterior of a wall of the kiln and communicating directly with the interior of the kiln through an opening in said wall said furnace and gas producer having a fuel bed comprising hollow bodies above the bottom of the ash pit having contracted openings therein leading to the fuel bed whereby air or steam or both may be uniformly supplied throughout the fuel bed and a second opening through said kiln wall above the furnace connecting the open air with the interior of the kiln for burning the produced gas.

5. The combination with a kiln for burning ware, of a combined furnace and gas producer built against the exterior of a wall of the kiln and communicating directly with the interior of the kiln through an opening in said wall said furnace and gas producer having a fuel bed comprising hollow bodies above the bottom of the ash pit having contracted openings therein leading to the fuel bed protected against obstructions whereby air or steam or both may be uniformly supplied throughout the fuel bed and a second opening through said kiln wall above the furnace connecting the open air with the interior of the kiln for burning the produced gas, and means for supplying steam and air to the confined space and compressed air to the second opening.

6. The combination with a kiln for burning ware, of a combined furnace and gas producer built against the exterior of a wall of the kiln and communicating directly with the interior of the kiln through an opening in said wall said furnace and gas producer having a fuel bed comprising hollow bodies above the bottom of the ash pit having contracted openings therein leading to the fuel bed protected against obstructions whereby air or steam or both may be uniformly supplied throughout the fuel bed and a second opening through said kiln wall above the furnace connecting the open air with the interior of the kiln for burning the produced gas, means for supplying steam and air to the confined space and compressed air to the second opening, and means for regulating the supply of steam and air to produce the gas and complete its combustion.

7. The combination with a kiln for burning ware having a wall with a combustion chamber on the interior and a stationary furnace, a gas producer chamber on the exterior with a connecting passage through the wall, the combined furnace and gas producer chamber having a door and a removable grate comprising hollow bodies having contracted openings through the coal bed, the door of the furnace being sufficiently large to permit withdrawal of the grate and thus permitting a supply of air in sufficient volume through said passage when the grate is withdrawn and the door is open to quickly cool the furnace.

8. The combination with a kiln for burning ware having a wall with a combustion chamber on the interior and a stationary furnace, a gas producer chamber on the exterior with a connecting passage through the wall, the combined furnace and gas producer chamber having a door and a removable grate comprising hollow bodies having contracted openings through the coal bed protected against obstruction, the door of the furnace being sufficiently large to permit withdrawal of the grate and thus permitting a supply of air in sufficient volume through said passage when the grate is withdrawn and the door is open to quickly cool the furnace, and a control variable steam and air supply through the grate whereby the furnace may be converted into a gas producer or vice versa.

9. The combination with a kiln for burning ware having a wall with a combustion chamber on the interior and a stationary furnace, a gas producer chamber on the exterior with a connecting passage through the wall, the combined furnace and gas producer chamber having a door and a removable grate comprising hollow bodies having contracted openings through the coal bed protected against obstruction, the door of the furnace being sufficiently large to permit withdrawal of the grate and thus permitting a supply of air in sufficient volume through said passage when the grate is withdrawn and the door is open to quickly cool the furnace, and a controlled variable steam and air supply through the grate whereby the furnace may be converted into a gas producer or vice versa, the kiln having a second opening into said combustion chamber, and a controlled variable air supply through the second opening whereby the proper amount of air may be supplied directly to the combustion chamber to complete the combustion.

10. The combination with a kiln for burning ware of a combined furnace and gas producer built adjacent a wall of the kiln comprising a chamber having a door and a removable grate with hollow bodies having contracted openings therein protected against obstruction, said chamber being connected directly to the interior of the kiln through an opening in said wall, the wall having a second opening above said furnace for supplying fresh air directly to the interior of the kiln, and a bag wall projecting above the first mentioned opening to cause mixing of the produced gas and fresh air whereby long passages from the gas producer to the kiln requiring cleaning are obviated and the air is mixed with the gas as soon as they enter the kiln insuring complete combustion and freedom from explosions.

11. The combination with a kiln for burning ware of a combined furnace and gas producer built adjacent a wall of the kiln comprising a chamber having a door and a removable grate with hollow bodies having contracted openings therein protected against obstruction, said chamber being connected directly to the interior of the kiln through an opening in said wall, the wall having a second opening above said furnace for supplying fresh air directly to the interior of the kiln, a bag wall projecting above the first mentioned opening to cause mixing of the produced gas and fresh air whereby long passages from the gas producer to the kiln requiring cleaning are obviated, and the air is mixed with the gas as soon as they enter the kiln insuring complete combustion and freedom from explosions, and means for supplying steam to the gas producer and compressed air to the second opening.

12. The combination with a kiln for burning ware of a combined furnace and gas producer built adjacent a wall of the kiln and connected directly to the interior of the kiln through an opening in said wall, the wall having a second opening above said furnace for supplying fresh air directly to the interior of the kiln, a bag wall projecting above the first mentioned opening to cause mixing of the produced gas and fresh air whereby long passages from the gas producer to the kiln requiring cleaning are obviated and the air is mixed with the gas as soon as they enter the kiln insuring complete combustion and freedom from explosions, means for supplying steam to the gas producer and compressed air to the second opening, and means for regulating the supplies of steam and fresh air in proportions to complete the combustion of produced gas.

13. The combination with a kiln for burning ware of a combined furnace and gas producer built adjacent an outer wall of the kiln and connected directly to the interior of the kiln through an opening in said wall, the wall having a second opening close to the first mentioned opening connecting the interior of the kiln directly with the outer air, means within the kiln and close to said openings to cause mixing of the air and gas as soon as they enter the kiln whereby long passages from the gas producer to the kiln and explosions are obviated and complete combustion of the gas and by-products effected, a door for the gas producer and furnace and a removable grate therein, said door being sufficiently large to permit removal of the grate whereby when the grate is removed and the door opened the furnace may be quickly cooled.

14. The combination with a kiln for burning ware of a combined furnace and gas producer built adjacent an outer wall of the kiln and connected directly to the interior of the kiln through an opening in said wall, said wall having a second opening close to the first mentioned opening connecting the interior of the kiln directly with the outer air, means within the kiln and close to said openings to cause mixing of the air and gas as soon as they enter the kiln whereby long passages from the gas producer to the kiln and explosions are obviated and complete combustion of the gas and by-products effected, a door for the gas producer and furnace and a removable grate therein having trunnions accessible when the door is closed and through which air and steam may be supplied uniformly throughout the fuel bed, and means for supplying regulated amounts of steam and air to the fuel and compressed air to the second opening.

15. The method of burning ware in a kiln consisting in burning the fuel in a furnace in close proximity to the kiln until the furnace and kiln are hot then converting the furnace into a gas producer by blowing steam and air through the grate of the furnace and delivering the products directly from the producer through an opening in the wall of the kiln and simultaneously forcing controlled supplies of air through a second opening in the wall of the kiln in close proximity to the first opening in sufficient quantities to burn the products before they are cooled down sufficiently to form deposits.

16. The method of burning ware in a kiln consisting in burning the fuel in a furnace in close proximity to the kiln until the furnace and kiln are hot, then converting the furnace into a gas producer by blowing steam and air through the grate of the furnace and delivering the products directly from the producer through an opening in the wall of the kiln and simultaneously forcing controlled supplies of air through a second opening in the wall of the kiln in close proximity to the first opening in sufficient quantities to burn the hot products before they are cooled down sufficiently to form deposits then removing the furnace grate and thus allow the kiln to quickly cool.

In testimony whereof I have hereunto set my hand this 8th day of March, 1921.

LOIS M. UNDERWOOD.